Oct. 30, 1934.  A. KANKOS  1,979,001
SAWING MACHINE
Filed Feb. 6, 1933  4 Sheets-Sheet 1
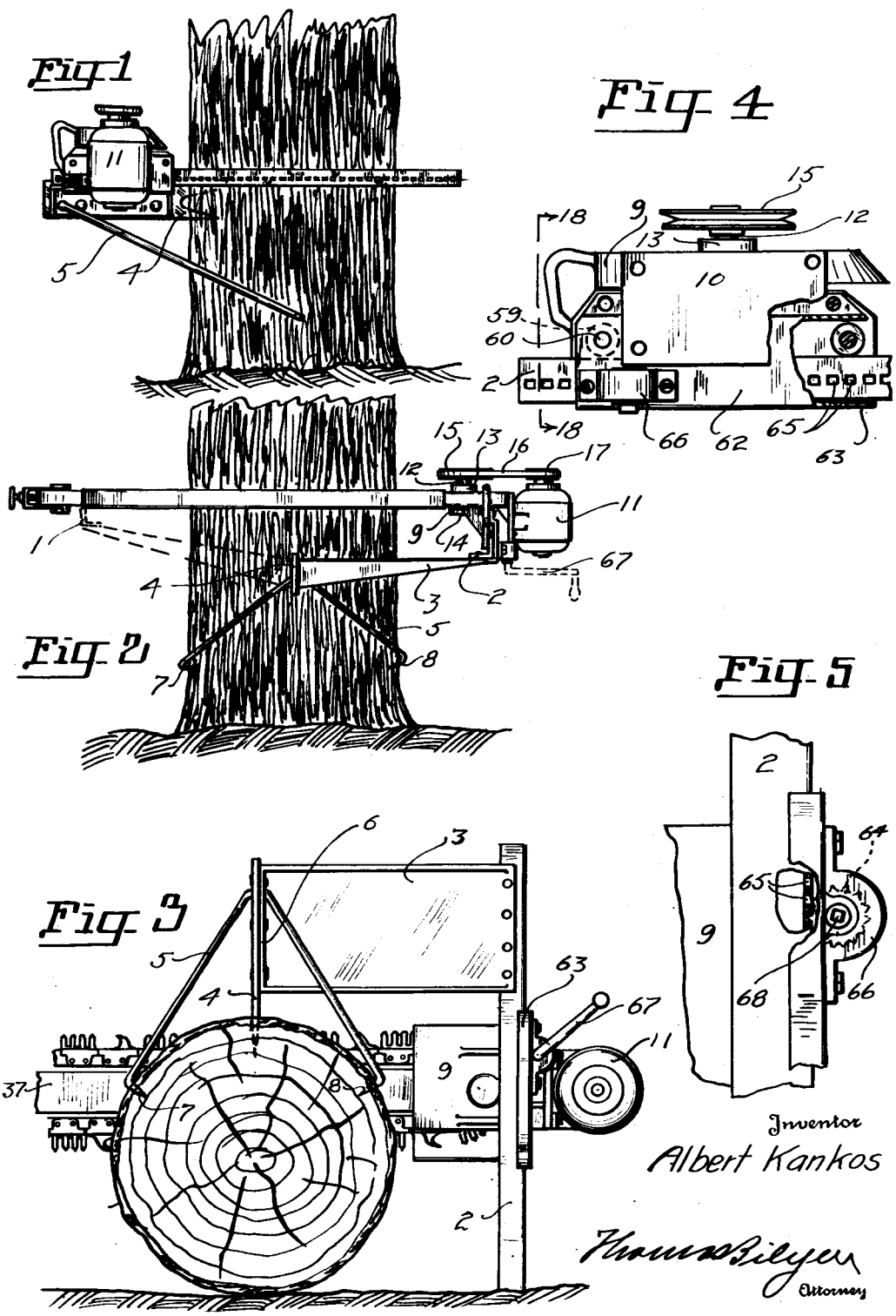
Inventor
Albert Kankos Oct. 30, 1934.  A. KANKOS  1,979,001
SAWING MACHINE
Filed Feb. 6, 1933  4 Sheets-Sheet 2
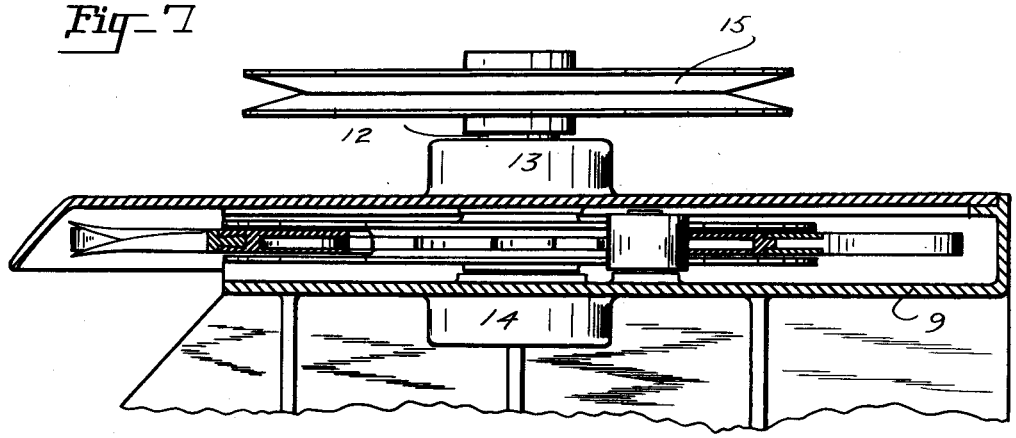
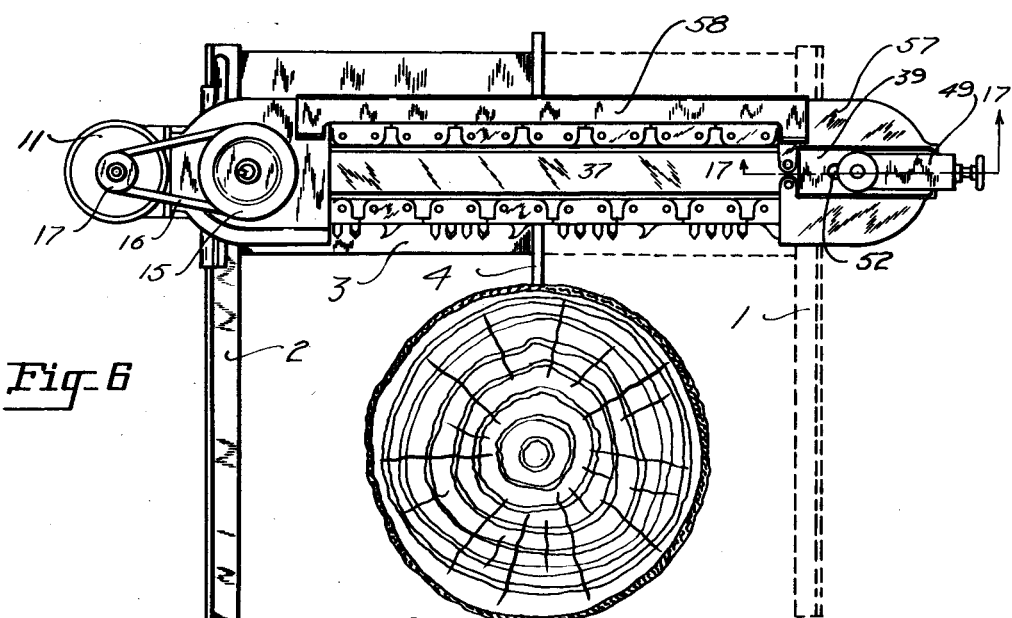
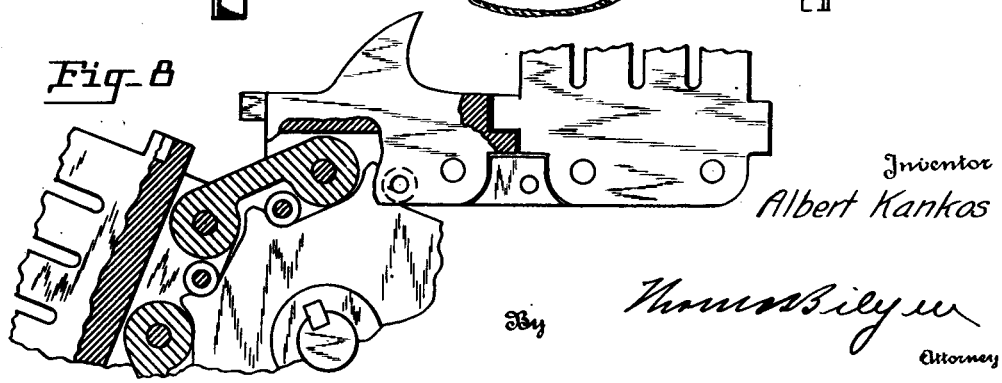
Inventor
Albert Kankos

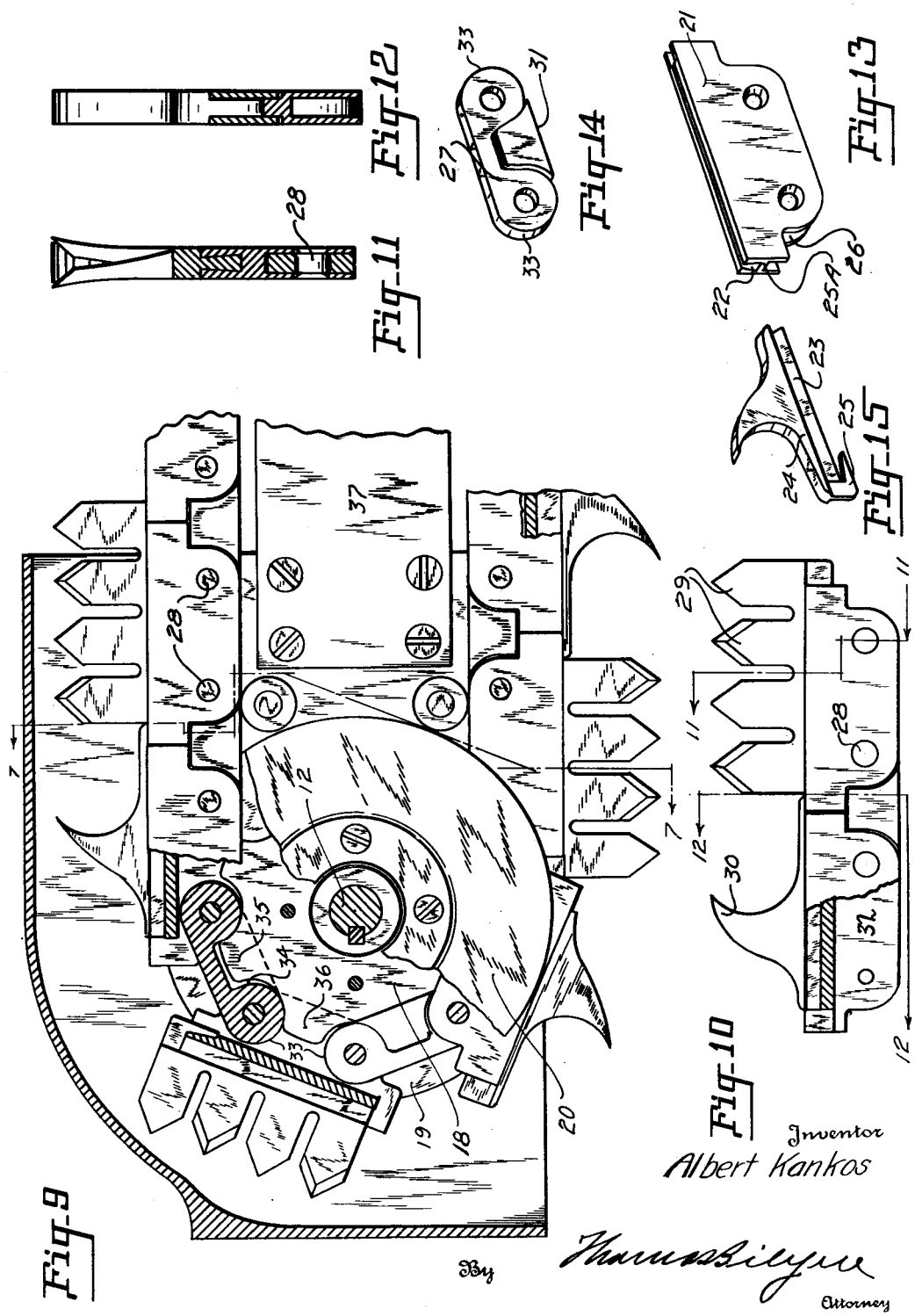

Oct. 30, 1934.　　　A. KANKOS　　　1,979,001
SAWING MACHINE
Filed Feb. 6, 1933　　　4 Sheets-Sheet 4
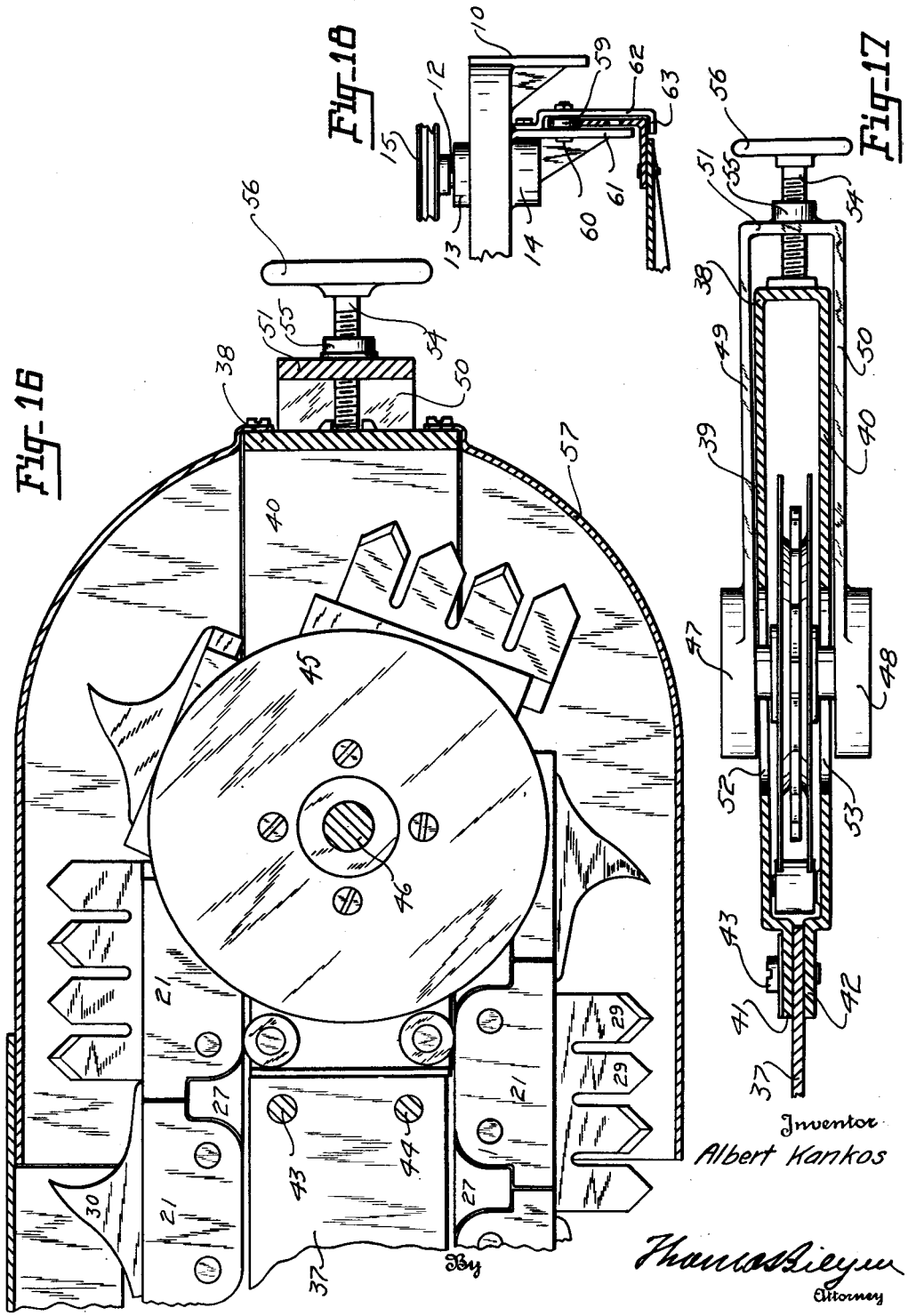
Inventor
Albert Kankos
By
Thomas Bilym
Attorney Patented Oct. 30, 1934

1,979,001

UNITED STATES PATENT OFFICE 1,979,001

SAWING MACHINE

Albert Kankos, Portland, Oreg.

Application February 6, 1933, Serial No. 655,330

1 Claim. (Cl. 143—135)

My invention relates to sawing devices, and has for its primary purpose and object the providing of a relatively light power driven saw that is portable and that is adapted for cutting vertical or horizontal members with equal facility.

My invention consists primarily of a rail or rails that are supported by a spud and by a bar that is hinged relative to the spud. The bar has hooks terminating its ends which are adapted for anchorage into the supporting portion of the material that is to be cut. A pair of spaced heads, carrying a driving and a driven sprocket, are roller mounted upon supporting means permitting the device to be rolled into engagement with the material to be cut along a line longitudinal of the rail or rails. An articulated endless saw is trained about the driving and the driven sprocket, and comprises primarily a plurality of links, one link of the series carrying cutter teeth, another link of the series carrying a rake tooth and the intermediate link of the series being a connecting link disposed between the cutter tooth carrying link and the rake tooth carrying link. The links are secured together by suitable connecting pins.

A prime mover as an electric motor is adapted to the assembly. However, I do not wish to be limited to an electric motor as the prime mover, as the device may be driven by means of a flexible shaft, and for under water work it may be found desirable to drive by means of a shaft terminating at, and being driven from, a point disposed above the water.

One of the objects of my invention consists in providing a relatively light and portable saw that is adapted for felling and bucking timber.

A still further object of my invention consists in providing a sawing unit that may be used under water for the cutting of piling and other submerged materials.

A still further object of my invention consists in so constructing the device that it may be assembled into the length indicated by the diameter of the material to be cut.

A still further object of my invention consists in so assembling the saw as an articulated cutting device, that it may be operated upon a portable support for the cutting of vertical or inclined members with a facility equal to that which may be used in the cutting of horizontal members.

A still further object of my invention is to provide, in a chain saw, readily removable and replaceable cutter bases carrying the saw teeth which may be changed without dismantling the chain, the changing of teeth being effected at the points where the chain is carried around the sprockets.

A still further object of my invention is to provide means whereby my chain saw may be fed into the material cut, by a rack and pinion or similar means for gaining a mechanical advantage.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

In the drawings:

Fig. 1 is an end view of the assembled device shown in position for the cutting of a vertical member.

Fig. 2 is a front view of the device shown in position for the cutting of a vertical member.

Fig. 3 is a side elevation of the assembled device shown in position for the cutting of a horizontal member. This view is made to illustrate the relative position of the feed mechanism.

Fig. 4 is a fragmentary sectional end view of the drive end of the assembled device. This view is made to illustrate the track and supporting wheels that ride thereupon.

Fig. 5 is a fragmentary sectional end view of the rack and pinion assembly that is provided for the raising and lowering of the saw relative to the track support that is used when the device is being used in the cutting of horizontal members.

Fig. 6 is a top plan view of the assembled device.

Fig. 7 is a fragmentary sectional end view of the driving sprocket and of the driving end of the frame and saw assembly. This view is taken on line 7—7 of Fig. 9, looking in the direction indicated.

Fig. 8 is a fragmentary sectional plan view of an alternative form of the driving sprocket and chain assembly.

Fig. 9 is a fragmentary sectional plan view of the driving sprocket and of the chain assembly adapted to the driving sprocket.

Fig. 10 is a fragmentary plan view of one of the cutting sections of the saw blade and of the raker tooth section of the saw blade.

Fig. 11 is a sectional end view of the cutter section of the saw blade. This view is taken on line 11—11 of Fig. 10, looking in the direction indicated.

Fig. 12 is a sectional end view of the intermediate link of the saw blade that is disposed between the raker section of the saw blade and the cutting section of the saw blade. This view is taken on line 12—12 of Fig. 10, looking in the direction indicated.

Fig. 13 is a perspective side view of the saw link that carries the raker tooth. In this view the raker tooth is shown removed from the link.

Fig. 14 is a perspective side view of the link that is disposed between the raker tooth section of the saw chain and the cutting tooth section of the saw chain.

Fig. 15 is a perspective side view of the raker tooth shown removed from the link carrier.

Fig. 16 is a top plan view of the idler sprocket around which the chain saw passes and illustrates the support for the sprocket and the means for maintaining the tension upon the saw.

Fig. 17 is a sectional side view of the sprocket assembly illustrated in Fig. 16 with the chain saw removed. This view is taken on line 17—17 of Fig. 6, looking in the direction indicated.

Fig. 18 is a fragmentary sectional side view of the drive end of the assembled device illustrating the track and supporting wheel mechanism. This view is taken on line 18—18 of Fig. 4 looking in the direction indicated.

Like reference characters refer to like parts throughout the several views.

I provide a frame for the support of my saw which may be comprised primarily of a pair of spaced rails 1 and 2. One of the rails has a bracket support 3 that inwardly extends therefrom and to the inner end of which a supporting spud 4 is affixed. This spud is sharpened upon its inner end for being driven into the material to be sawed. The rail 1 may be dispensed with and the entire structure supported upon the single rail 2, the rail being so positioned relative to the supported device that the assembly is practically counterbalanced. The spud 4 is made relatively broad, where a single rail is used, to counteract any turning tendency that might be developed. A supporting bar 5 passes through the spud 4 and through the end wall 6 of the bracket 3. The supporting bar 5 is turned where the same passes through the spud and end plate, and is provided with supporting hooks 7 and 8 that terminate its ends. These hooks are adapted for being driven into the material to be sawed and act as supports for the assembly. The driving head of my device is comprised of a primary frame 9. A face 10 terminates the outer end of the frame to facilitate the placing of a prime mover 11, as an electric motor, thereupon.

While I have here shown an electric motor for driving my device, it is obvious that the drive may be effected through the use of a flexible shaft to thereby eliminate the weight of the prime mover from the device where desired. For under-water work it may be found desirable to drive with a vertical shaft that would terminate above the surface of the water. A shaft 12 is shown having its oppositely disposed ends within suitable hubs 13 and 14 that are disposed upon the opposite sides of the primary frame. A driving pulley or sprocket 15 is disposed upon one end of the shaft and any suitable driving element as a belt 16 is trained about the pulley 15 and about the pulley 17 disposed upon the armature shaft of the prime mover 11.

Where a flexible drive is used for furnishing power to the device, power may be applied to the shaft 12 through coacting gears, and where the device is to be used for under water work any suitable vertical driving shaft may be associated with and upwardly extended from the shaft 12 and be secured thereto by any suitable flexible driving connection. A multiple faced sprocket 18 is disposed upon the shaft 12, and shrouds 19 and 20 are disposed upon the oppositely disposed sides of the sprocket 18.

My saw is comprised of an endless chain made up of a plurality of cutter carrying links joined by connecting links. Cutter carrying links 21 are each provided with a dove-tail slot 22 adapted for receiving sloping side walls 23 of cutter base 24. The cutter base 24 is further provided with locking lug 25 disposed upon its advancing end and adapted for engagement with web 25A disposed within the link 21. The links 21 are each further provided with a recess 26 adapted to receive the ends of connecting links 27, to which links 21 are attached by any suitable means as by pins 28.

Cutter bases 24 are surmounted by suitable teeth as by cutter teeth 29 or raker teeth 30. In the particular adaptations of my device disclosed in the drawings I show links each provided with four cutter teeth alternating with links each provided with one raker tooth. It will thus be seen that the endless cutting blade of my saw is comprised of cutter carrying links alternating with connecting links, all hingedly secured together about suitable connecting pins, the cutter carrying links being equipped with cutter teeth alternating with raker teeth.

A tooth receiving socket 31 is disposed within the base of connecting link 27, and a tooth receiving slot 32 is disposed within the base of the cutter carrying link 21. Connecting link 27 is provided with semi-cylindrical tooth engaging surfaces 33 at its ends and with tooth engaging surface 34 within the socket 31. Tooth 35 of the sprocket 18 is adapted to engage with the surface 34 within the socket 31, and a tooth 36 is adapted to engage with the surfaces 33 within the slot 32. The teeth of this sprocket are so positioned as to engage in recurring cycles with the respective links comprising the saw.

A spreader bar 37 connects the driving head of the assembly with the driven head of the assembly. A yoke 38 primarily comprises the frame for the driven head. The yoke is formed into a U having side walls 39 and 40 and the terminal ends 41 and 42 of the side walls are spaced apart sufficiently to permit the spacer bar 37 being placed therebetween and the same are secured together by any suitable fastening means as through the use of fastening screws 43 and 44. A shrouded toothed sprocket 45 is rotatably mounted upon the sprocket shaft 46 and the shaft 46 is journaled within suitable bearings disposed within the hubs 47 and 48. The hubs 47 and 48 are secured to the side walls 49 and 50 of the yoke 51. The sprocket shaft 46 passes through suitable clearance slots 52 and 53 that are disposed within the side walls 39 and 40 and a suitable working tension is maintained upon the endless saw by means of an adjusting screw 54. The adjusting screw 54 passes centrally through hub 55 and the end wall of the yoke 51 and bears against the yoke 38. An adjusting hand screw 56 is disposed upon the outer end of the adjusting screw 54. A hood 57 is disposed about the driven head of the assembly to protect the user from injury.

Where the device is to be used for the cutting of material in a vertical position it may be found desirable to place a guard upon the outer cutting saw. This guard is best illustrated in Fig. 6 at 58. As the outer saw enters the kerf of a cut made by the working or inner saw, the guard 58 is automatically released from position and is manually replaced at the beginning of the next cut or during the transfer of the device.

The saw assembly and the driving mechanism of my device has one or more rollers 59 illustrated in Fig. 18. The rollers 59 are suitably journaled about a journal bearing 60. The rollers are disposed between suitable guideways 61 and 62. The guideways 61 and 62 are sufficiently spaced apart to permit the rail or rails 1 and 2 being moved therebetween to provide a rolling support of the saw assembly relative to that of the sub-frame assembly. The outer guideway 62 may have a return bend 63 disposed at its lower end to permit the same passing beneath the base of the rail to prevent the premature dislodgment of the saw assembly relative to that of the rails. This rolling support is one of the primary features of my invention.

When it is desired to use a mechanical drive for feeding my device into the material to be cut, I provide a toothed pinion 64 which engages with perforations 65 disposed in the vertical leg of rail 1. The pinion 64 is journaled within and housed by casing 66 mounted upon the guide 62, and is actuated by a handle 67. The handle 67 may be made removable as by fittings into a socket 68.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claim which follows.

What I claim is:

In a chain saw the combination of a plurality of spaced carrier links having each a dovetailed groove longitudinally disposed along the major portion of its length; a plurality of intermediate links each disposed between and pivotally interconnecting a pair of spaced carrier links; and toothed elements, each provided with a dovetail along the base thereof, disposed upon the spaced carrier links and engaged therewith by means of the interlocking dovetail bases and dovetailed grooves, said toothed elements each having a depending key disposed at the toe thereof and engaging the forward face of its carrier link whereby the longitudinal travel of the toothed element relative to the carrier link may be limited.

ALBERT KANKOS.